(12) United States Patent
Akimatsu (10) Patent No.: US 9,386,167 B2
(45) Date of Patent: Jul. 5, 2016

(54) IMAGE READING APPARATUS HAVING UPPER AND LOWER CONVEYANCE PATHS CONNECTED BY A CURVED CONVEYANCE PATH

(71) Applicant: BROTHER KOGYO KABUSHIKI KAISHA, Nagoya-shi, Aichi-ken (JP)

(72) Inventor: Takayuki Akimatsu, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/626,495

(22) Filed: Feb. 19, 2015

(65) Prior Publication Data
US 2015/0242715 A1 Aug. 27, 2015

(30) Foreign Application Priority Data
Feb. 21, 2014 (JP) .................................. 2014-031694

(51) Int. Cl.
*G06K 15/16* (2006.01)
*H04N 1/00* (2006.01)

(52) U.S. Cl.
CPC ........................................ *H04N 1/00* (2013.01)

(58) Field of Classification Search
None
See application file for complete search history.

(56) References Cited

U.S. PATENT DOCUMENTS

| 7,342,694 | B2* | 3/2008 | Kusunose | ............ | H04N 1/0057 |
| | | | | | 358/401 |
| 7,744,077 | B2* | 6/2010 | Buxton | ..................... | B65H 5/38 |
| | | | | | 271/3.17 |
| 2005/0254105 | A1 | 11/2005 | Muzzin et al. | | |
| 2008/0080024 | A1 | 4/2008 | Ishido | | |
| 2009/0168127 | A1 | 7/2009 | Hamada et al. | | |
| 2011/0242622 | A1 | 10/2011 | Takeuchi et al. | | |

FOREIGN PATENT DOCUMENTS

| JP | 9-46472 | A | 2/1997 |
| JP | 11-136442 | A | 5/1999 |
| JP | 2005-333633 | A | 12/2005 |
| JP | 2007-166229 | A | 6/2007 |
| JP | 2008-048190 | A | 2/2008 |
| JP | 2009-164764 | A | 7/2009 |
| JP | 4818038 | B2 | 11/2011 |
| JP | 5126270 | B2 | 1/2013 |

* cited by examiner

*Primary Examiner* — Thomas D Lee
(74) *Attorney, Agent, or Firm* — Merchant & Gould P.C.

(57) ABSTRACT

An image reading apparatus includes a conveyor defining a conveyance path including an upper path, a lower path including a reference portion and a first and second inclined portions, and a curved path, and a first reading unit for reading an image of the sheet when passing the first inclined portion. The conveyor includes a chute member forming a guide surface. The chute member includes a first chute member forming a first guide surface defining the upper path and a second chute member forming a second guide surface defining the first inclined portion. The first chute member forms a third guide surface defining the second inclined portion.

20 Claims, 9 Drawing Sheets

IMAGE READING APPARATUS HAVING UPPER AND LOWER CONVEYANCE PATHS CONNECTED BY A CURVED CONVEYANCE PATH

CROSS-REFERENCE TO RELATED APPLICATIONS

This application claims priority from Japanese Patent Application No. 2014-031694 filed on Feb. 21, 2014, the entire subject-matter of which is incorporated herein by reference.

TECHNICAL FIELD

The disclosure relates to an image reading apparatus.

BACKGROUND

There has been disclosed an image reading apparatus having a conveyor and a reading unit, in which the conveyor defines a conveyance path for conveying sheets, and the conveyance path includes an upper path, a lower path that is positioned on a lower side from the upper path, and a curved path that connects the upper path and the lower path. The conveyor conveys each sheet from the upper path to the lower path through the curved path. The reading unit reads an image of each sheet which is conveyed along the conveyance path by the conveyor.

The conveyor includes a chute member which forms a guide surface. The guide surface extends so as to be contactable with a first surface of the sheet facing the lower side in the upper path and facing the upper side in the lower path, thereby guiding the corresponding sheet in the conveyance path.

More specifically, the chute member includes a first chute member and a second chute member. The first chute member forms a first guide surface, which configures the guide surface and defines the upper path. The second chute member forms a second guide surface, which configures the guide surface and defines the lower path. The first chute member has a holding portion. The holding portion is a recess formed from the first guide surface toward the lower path side, and holds the reading unit.

In this image reading apparatus, the conveyor conveys each sheet from the upper path to the lower path through the curved path. When a sheet passes the upper path, the reading unit reads an image of the first side of the sheet.

However, in the above-described related-art image reading apparatus, since the first chute member having the holding portion forms the whole first guide surface, the first chute member is likely to be made large as a component. In general, in a manufacturing process, in a case of installing the reading unit in the holding portion, in order to prevent dust, fine particles, and the like from entering the vicinity of the reading units, work for mounting the reading units is performed in a clean room. In this case, as the size of components (first chute members) having holding portions increases, handling becomes complicated. For this reason, according to the related-art image reading apparatus, it may be feared that it will be difficult to efficiently perform work for mounting the reading unit in the holding portion of the first chute member in a clean room, and thus an improvement in productivity is difficult. On the other hand, in a case of installing the reading unit in the holding portion at a place which is not a clean room, there may be a problem in which dust, fine particles, and the like is likely to enter the vicinity of the reading unit, resulting in a decrease in reading quality.

SUMMARY

Therefore, it is preferably to provide an image reading apparatus capable of contributing to productivity growth while being capable of suppressing a reduction in reading quality.

In one aspect of the disclosure, an image reading apparatus comprises: a conveyor configured to define a conveyance path for conveying a sheet, the conveyance path comprising an upper path, a lower path that is positioned below the upper path and a curved path that connects the upper path and the lower path; and a first reading unit configured to read an image of the sheet being conveyed by the conveyor, wherein the lower path comprises: a reference portion, which is a predetermined portion positioned on the lower side from the curved path; a first inclined portion inclined downward from the curved path toward the reference portion; and a second inclined portion inclined upward from the reference portion toward a direction opposite to the curved path, wherein the first reading unit is configured to read an image of the sheet when the sheet passes one of the first inclined portion and the second inclined portion, wherein the conveyor comprises a chute member which forms a guide surface, wherein the chute member comprises: a first chute member that forms a first guide surface, the first guide surface configuring the guide surface and defining the upper path; and a second chute member that forms a second guide surface, the second guide surface configuring the guide surface and defining the one of the first inclined portion and the second inclined portion, and wherein the first chute member forms a third guide surface that defines the other of the first inclined portion and the second inclined portion of the guide surface.

BRIEF DESCRIPTION OF THE DRAWINGS

The present disclosure is illustrated, and not limited, by way of example by the accompanying figures in which like reference numerals indicate similar elements.

FIG. 4 is a perspective view illustrating a portion of the image reading apparatus of the illustrative embodiment including a first cover member, a first chute member, a second chute member, and so on;

DETAILED DESCRIPTION

Hereinafter, an image reading apparatus according to an illustrative embodiment will be described with reference to the accompanying drawings.

Figure 1:
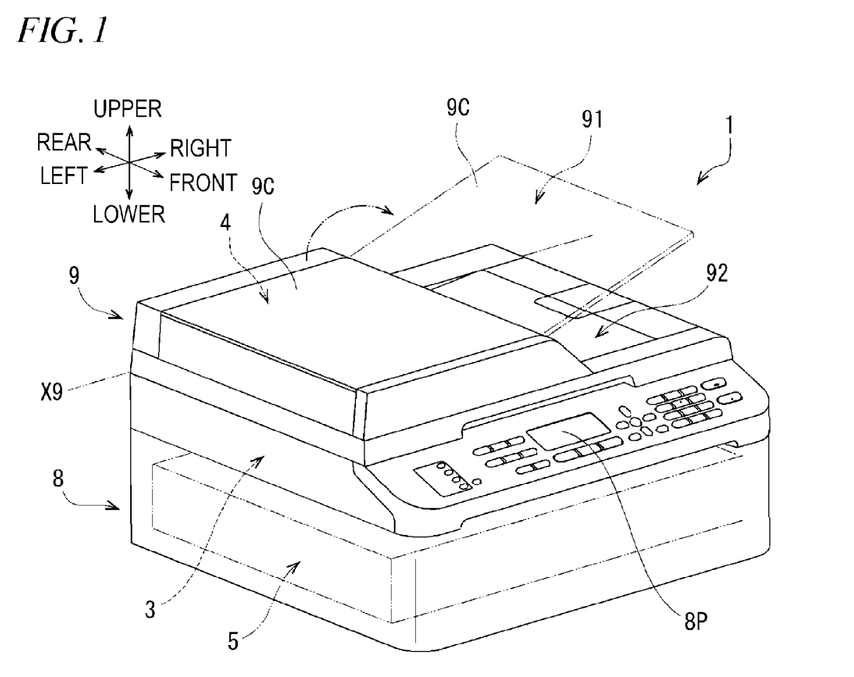
FIG. 1 is a perspective view illustrating an image reading apparatus of an illustrative embodiment.

As shown in FIG. 1, an image reading apparatus 1 of an illustrative embodiment is a specific example of an image reading apparatus. In FIG. 1, on the assumption that the operation panel (8P) side is referred to as the front side of the apparatus, and the left hand side of a user facing the operation panel 8P is referred to as the left side of the apparatus, the front side, rear side, left side, right side, upper side, and lower side of the apparatus are indicated. Further, directions shown in FIGS. 2 to 11 are indicated so as to correspond to the directions shown in FIG. 1. Hereinafter, individual components of the image reading apparatus 1 will be described with reference to some drawings such as FIG. 1.

<Configuration>

Figure 2:
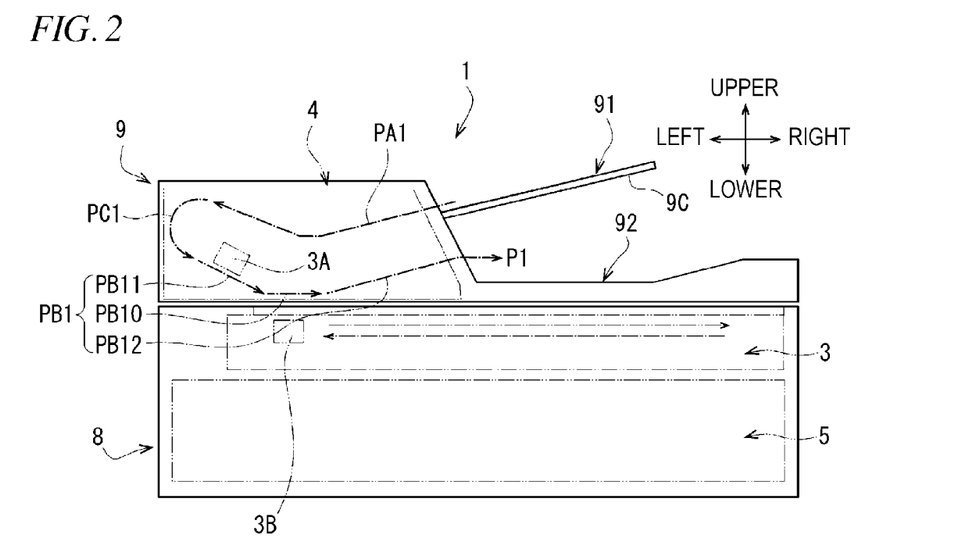
FIG. 2 is a side view schematically illustrating the image reading apparatus of the illustrative embodiment.
Figure 3:
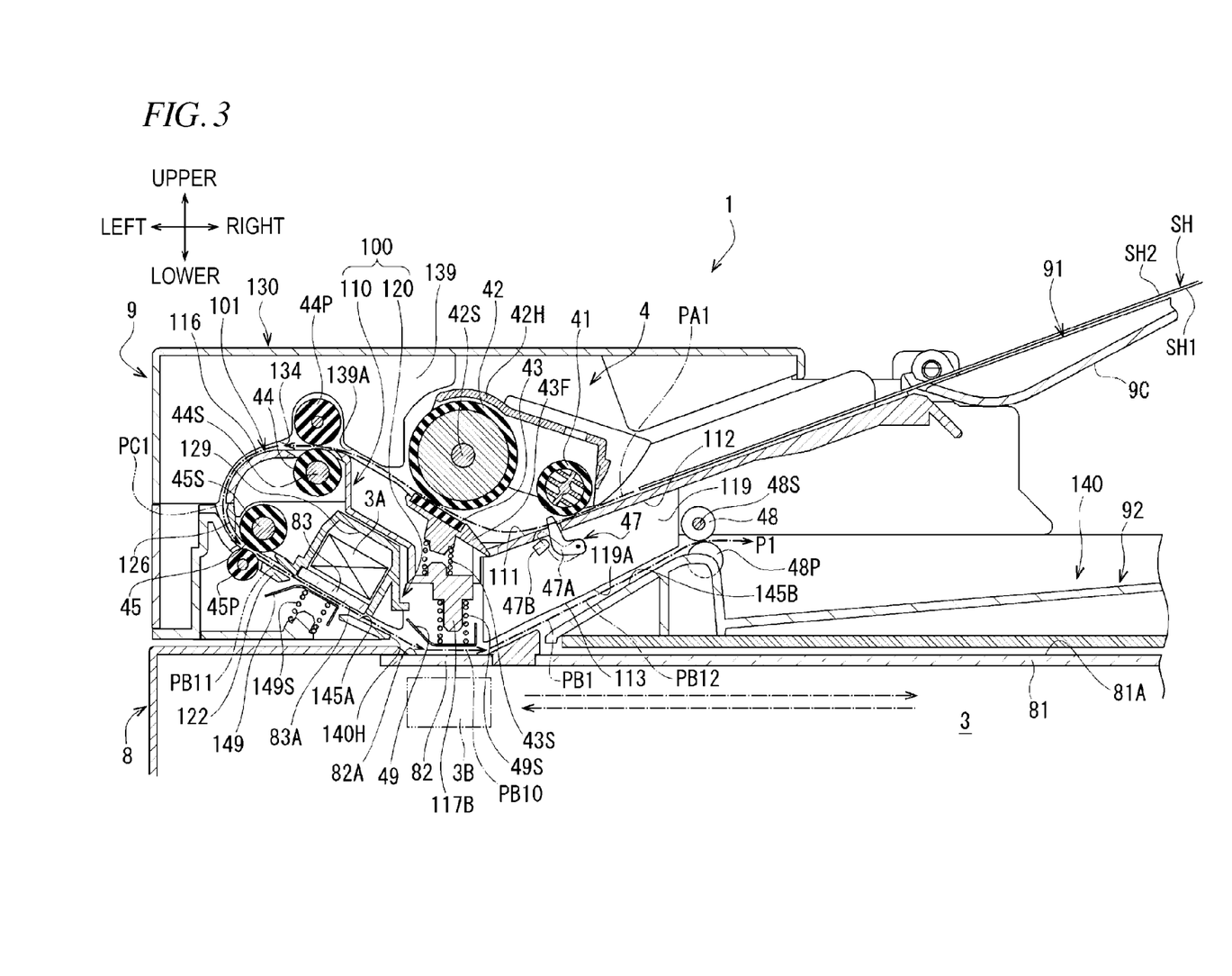
FIG. 3 is a cross-sectional view schematically illustrating a portion of the image reading apparatus of the illustrative embodiment.

As shown in FIGS. 1 to 3, the image reading apparatus 1 includes a main body unit 8, an opening-closing unit 9, an image forming unit 5, a reading unit 3, a feeding tray 91, a discharge tray 92, and a conveyor 4. The main body unit 8 is a flat body having substantially a box shape. As shown in FIG. 1, on the front surface of the main body unit 8, the operation panel 8P which is a touch panel or the like is provided.

As shown in FIGS. 1 and 2, the image forming unit 5 is accommodated in a lower portion of the inside of the main body unit 8. The image forming unit 5 is configured to form an image on a sheet by an electrophotographic or inkjet print mechanism.

As shown in FIG. 3, on the top surface of the main body unit 8, first platen glass 81 and second platen glass 82 are disposed. A document supporting surface 81A is formed by the top surface of the first platen glass 81. When the reading unit 3 reads the image of a document which is a read target while being in a stop state, the document supporting surface 81A supports the document from below. Examples of the document which is a read target include sheets such as paper sheets and OHP sheets, books, etc. The second platen glass 82 is positioned on the left side of the first platen glass 81 and extends in an elongated shape in a front-rear direction. A read surface 82A is formed by the top surface of the second platen glass 82. When the reading unit 3 reads the images of sheets SH which are conveyed one at a time by the conveyor 4, the read surface 82A guides each conveyed sheet SH from the below.

As shown in FIG. 1, the opening-closing unit 9 is supported by a hinge (not shown) disposed at the upper end edge of the rear surface side of the main body unit 8 such that it may swing around an opening-closing shaft center X9 extending in a left-right direction. In a state where the opening-closing unit 9 is at a closed position shown in FIGS. 1 to 3, the opening-closing unit covers the document supporting surface 81A from above. Although not shown in the drawings, the opening-closing unit 9 swings around the opening-closing shaft center X9 such that its front end portion is displaced to the upper rear side, whereby the opening-closing unit is displaced to an open position for exposing the document supporting surface 81A. Therefore, a user may make the document supporting surface 81A support a document which is a read target.

As shown in FIGS. 2 and 3, the reading unit 3 includes a read sensor 3B which is accommodated in an upper portion of the inside of the main body unit 8, a scanning mechanism (not shown), and a read sensor 3A which is accommodated in the opening-closing unit 9.

The read sensor 3B is positioned below the document supporting surface 81A and the read surface 82A. The scanning mechanism (not shown) reciprocates the read sensor 3B in the left-right direction below the document supporting surface 81A inside the main body unit 8 such that the read sensor 3B reads an image of a document supported on the document supporting surface 81A. Also, the scanning mechanism (not shown) stops the read sensor 3B at a predetermined read position below the read surface 82A inside the main body unit 8 such that the read sensor 3B reads an image of a sheet SH which is conveyed by the conveyor 4.

The read sensor 3A is disposed on a conveyance path P1 inside the opening-closing unit 9 as will be described later. As shown in FIG. 3, the read sensor 3A faces the conveyance path P1 with third platen glass 83 interposed therebetween. While the read sensor 3A reads an image of a sheet SH which is conveyed by the conveyor 4, a read surface 83A of the third platen glass 83 guides the sheet SH from above.

As the read sensors 3A and 3B, a known image reading sensor such as a contact image sensor (CIS) or a charge coupled device (CCD) may be used.

As shown in FIGS. 2 and 3, the feeding tray 91, the discharge tray 92, and the conveyor 4 are provided at the opening-closing unit 9. The feeding tray 91 is formed at the right portion of the opening-closing unit 9 by spreading a closed cover 9C shown by a solid line in FIG. 1 as shown by an alternate long and two short dashes line in FIG. 2. The discharge tray 92 is positioned on the lower side from the feeding tray 91.

As shown in FIG. 3, the feeding tray 91 supports sheets SH to be conveyed as read targets by the conveyor. In a case where a sheet SH is supported on the feeding tray 91, a surface of the sheet SH facing the lower side is referred to as a first surface SH1, and the other surface of the sheet SH facing the upper side. That is, the surface of the sheet SH opposite to the first surface SH1 is referred to as a second surface SH2. If images of a sheet SH are read by the read sensors 3A and 3B, the sheet SH is conveyed by the conveyor 4, thereby being discharged onto the discharge tray 92. If the sheet SH is discharged onto the discharge tray 92, the first surface SH1 faces the upper side, and the second surface SH2 faces the lower side.

As shown in FIGS. 3 to 7, the conveyor 4 includes a chute member 100, a first cover member 130, and a second cover member 140. The chute member 100, the first cover member 130, and the second cover member 140 have a plurality of guide surfaces (which will be described later) contactable with the first surface SH1 or second surface SH2 of each sheet SH inside the opening-closing unit 9. The conveyor 4 defines the conveyance path P1 shown in FIGS. 2 and 3, as a space surrounded by the plurality of guide surfaces. The conveyance path P1 includes an upper path PA1, a lower path PB1, and a curved path PC1.

The upper path PA1 extends from the feeding tray 91 toward the left end side of the opening-closing unit 9. The upper path PA1 is inclined downward from the feeding tray 91 to a position located between a feeding roller 41 and a separation roller 42, and then is inclined upward.

The lower path PB1 is positioned below the upper path PA1. The lower path PB1 extends from the vicinity of the left end of the opening-closing unit 9 to the discharge tray 92. The lower path PB1 is inclined downward from the vicinity of the left end of the opening-closing unit 9 so as to approach the read surface 82A, and extends almost horizontally along the read surface 82A toward the right side, and then is inclined upward toward the discharge tray 92.

The curved path PC1 is curved like the outer boundary of the left side of a circle, and is connected to the left end of the upper path PA1 and the left end of the lower path PB1.

The lower path PB1 includes a first inclined portion PB11, a second inclined portion PB12, and a reference portion PB10 interposed therebetween. The reference portion PB10 is a portion extending almost horizontally along the read surface 82A toward the right side, that is, a portion positioned on the lower side from the curved path PC1.

The first inclined portion PB11 of the lower path PB1 is a portion inclined downward from the vicinity of the left end of the opening-closing unit 9 so as to approach the read surface 82A, that is, a portion inclined downward from the curved path PC1 toward the reference portion PB10.

The second inclined portion PB12 of the lower path PB1 is a portion inclined upward from the read surface 82A toward the discharge tray 92. That is, the second inclined portion PB12 is a portion inclined upward from the reference portion PB10 toward a side opposite to the curved path PC1.

The conveyor 4 conveys each sheet SH from the upper path PA1 of the conveyance path P1 to the lower path PB1 through the curved path PC1. Along the conveyance path P1, each sheet SH is conveyed to the left in the upper path PA1, and turns to the right in the curved path PC1, and then is conveyed to the right in the lower path PB1. In the conveyance path P1, the right end side of the upper path PA1 is the upstream side of the conveyance direction, and the right end side of the lower path PB1 is the downstream side of the conveyance direction.

The specific configuration of the chute member 100, the first cover member 130, and the second cover member 140 defining the above described conveyance path P1 will be described in detail.

As shown in FIGS. 2 to 6, the chute member 100 includes a first chute member 110 and a second chute member 120, and is formed by assembling them. The first chute member 110 and the second chute member 120 are resin moldings which may be formed of a thermoplastic resin by injection molding. Also, the first cover member 130 and the second cover member 140 are resin moldings which may be formed of a thermoplastic resin by injection molding.

Figure 5:
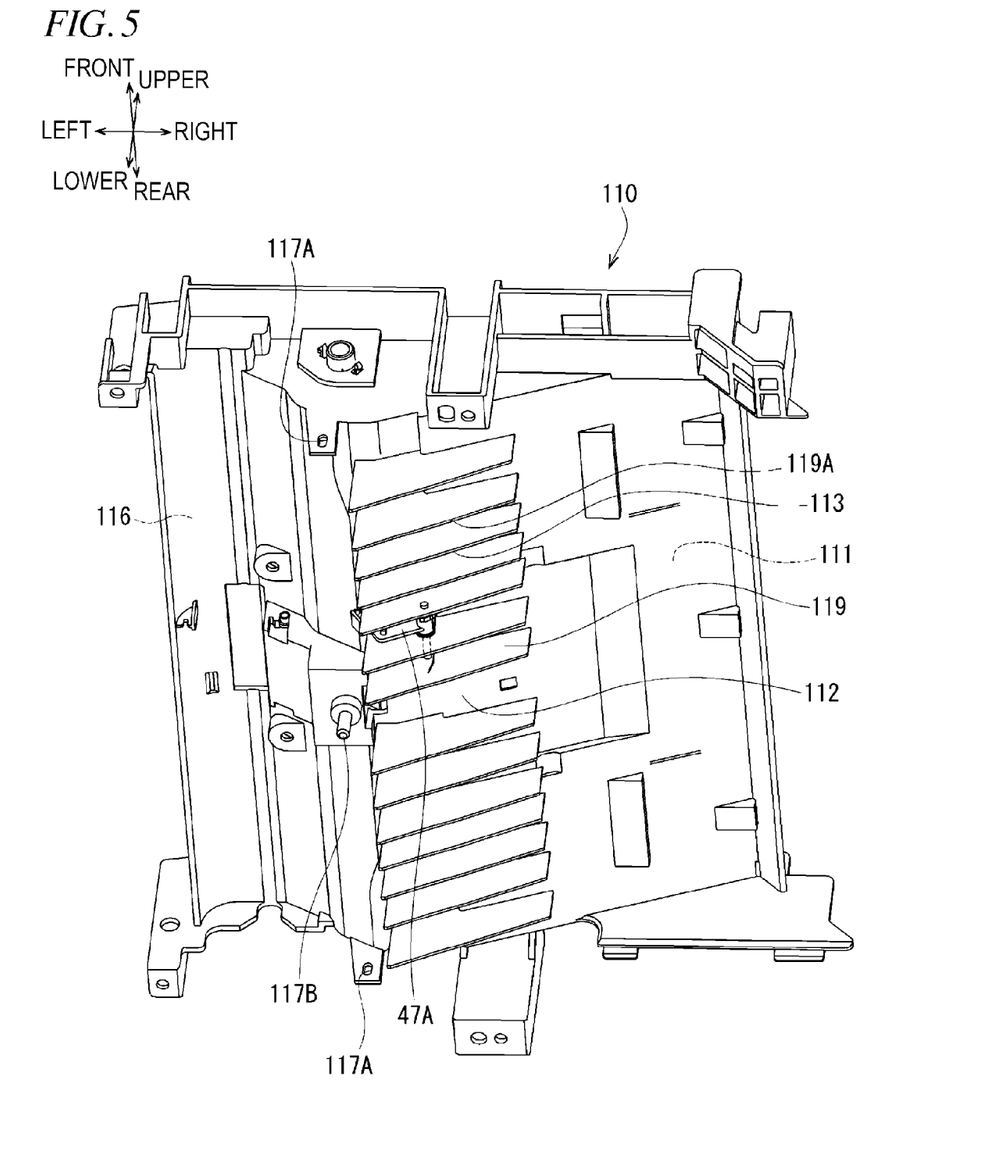
FIG. 5 is a perspective view illustrating the first chute member of the image reading apparatus of the illustrative embodiment as seen from below.

As shown in FIGS. 3 and 5, the first chute member 110 extends in the front-rear direction and the left-right direction. As shown in FIG. 3, the right portion of the upper surface of the first chute member 110 is connected to the left end edge of the upper surface of the cover 9C when the cover is spread, and is inclined downward toward the left, and the left portion of the upper surface of the first chute member 110 extends to the vicinity of the left end of the opening-closing unit 9 while being inclined upward toward the left. The upper surface of the first chute member 110 forms a first guide surface 111 which defines the upper path PA1. The first guide surface 111 extends so as to be contactable with the first surface SH1 of a sheet SH which is conveyed in the upper path PA1, thereby guiding the sheet SH to the lower side.

As shown in FIGS. 3 and 5, the left end portion of the first chute member 110 has an upper curved surface 116, which extends in the left direction and turns to the right, in an arc shape. The upper curved surface 116 defines the upper portion of the curved path PC1. The upper curved surface 116 extends so as to be contactable with the first surface SH1 of a sheet SH which is conveyed in the upper portion of the curved path PC1, thereby guiding the sheet SH from below and from the right side.

Figure 6:
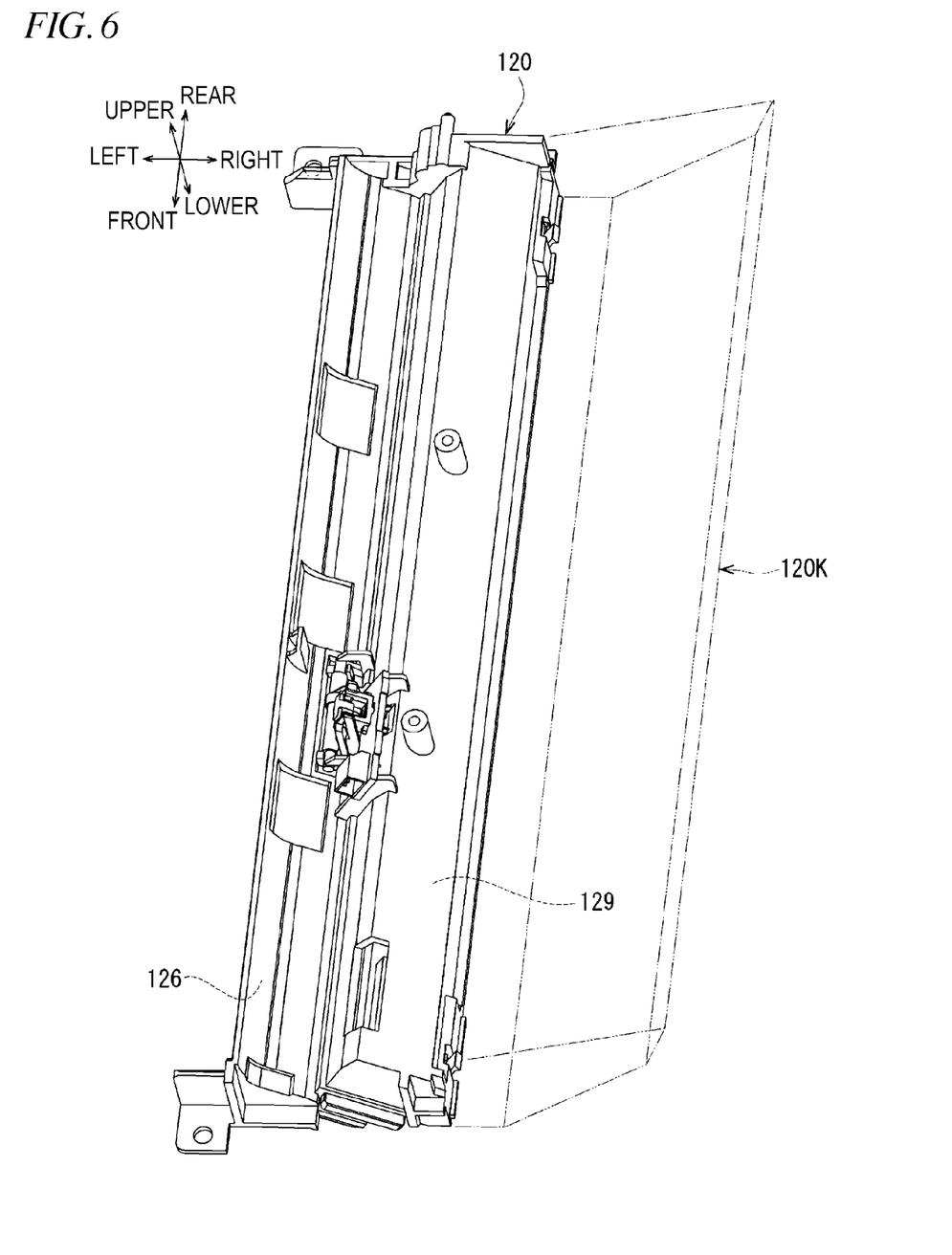
FIG. 6 is a perspective view illustrating the second chute member of the image reading apparatus of the illustrative embodiment.
Figure 7:
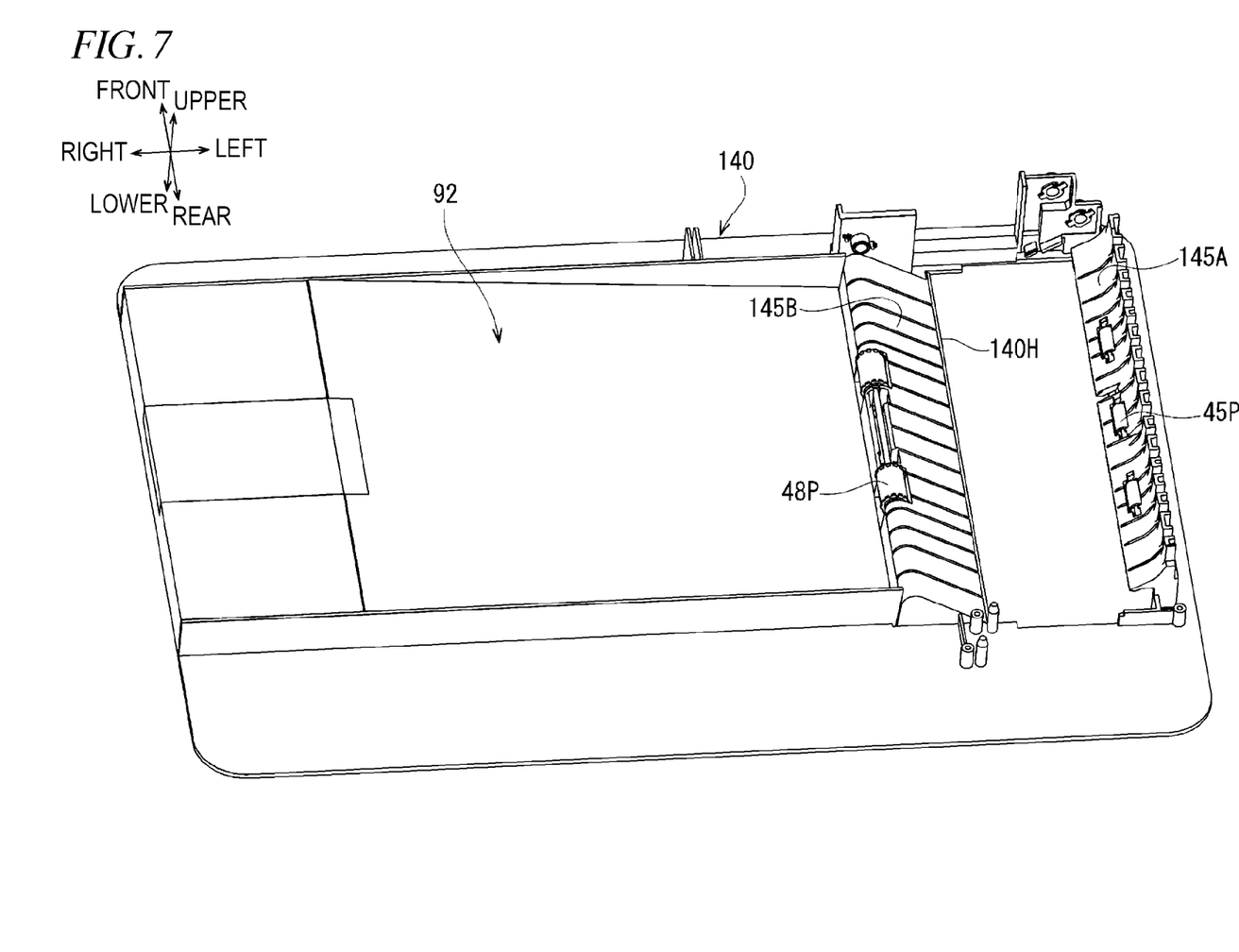
FIG. 7 is a perspective view illustrating a second cover member of the image reading apparatus of the illustrative embodiment.

As shown in FIGS. 3 and 6, the second chute member 120 extends in the front-rear direction and the left-right direction. The length of the second chute member 120 in the left-right direction is almost equal to the length of the left portion of the first chute member 110 inclined upward toward the left side. That is, the length of the second chute member 120 in the left-right direction is about half of the length of the first chute member 110 in the left-right direction. The second chute member 120 is assembled with the left portion of the first chute member 110 from below.

The left end portion of the second chute member 120 has a lower curved surface 126, which extends downward and turns to the right, in an arc shape. The lower curved surface 126 defines the lower portion of the curved path PC1. The lower curved surface 126 extends so as to be contactable with the first surface SH1 of a sheet SH which is conveyed in the lower portion of the curved path PC1, thereby guiding the sheet SH from the right side and from above.

As shown in FIG. 3, the lower surface of the second chute member 120 is connected to the lower curved surface 126 and is inclined downward toward the right side. The lower surface of the second chute member 120 forms a second guide surface 122 which defines the first inclined portion PB11 of the lower path PB1. The second guide surface 122 extends so as to be contactable with the first surface SH1 of a sheet SH which is conveyed in the first inclined portion PB11, thereby guiding the sheet SH from above.

The second chute member 120 has a holding portion 129. The holding portion 129 is a recess formed from the second guide surface 122 toward the upper right side, that is, toward the upper path PA1. The read sensor 3A is held in the holding portion 129. The opening of the holding portion 129 is covered by the third platen glass 83.

The read surface 83A of the third platen glass 83 is inclined downward toward the right side, along the first inclined portion PB11. The read surface 83A defines the first inclined portion PB11, together with the second guide surface 122. The read sensor 3A faces the first inclined portion PB11 with the read surface 83A of the third platen glass 83 interposed therebetween.

As shown in FIG. 5, in a lower surface 112 of the first chute member 110 facing a side opposite to the first guide member 111, a pair of front and rear pressing-member holding portions 117A and a spring holding portion 117B are formed. The pressing-member holding portions 117A support the front end portion and rear end portion of a pressing member 49 shown in FIG. 3, respectively. Between the spring holding portion 117B and the pressing member 49, a pressing spring 49S is disposed as shown in FIG. 3.

As shown in FIG. 3, the pressing member 49 is positioned close to the right side of the second guide surface 122, and faces the read surface 82A from above. The pressing spring 49S presses the pressing member 49 toward the read surface 82A. The lower surface of the pressing member 49 defines the reference portion PB10 of the lower path PB1. The lower surface of the pressing member 49 extends so as to be contactable with the first surface SH1 of a sheet SH which is conveyed in the reference portion PB10, thereby guiding the sheet SH from above.

As shown in FIGS. 3 and 5, on the lower surface 112 of the first chute member 110, a plurality of ribs 119 is formed. The ribs 119 are on the right side with respect to the pressing-member holding portions 117A and the spring holding portion 117B, and protrude from the lower surface 112 downward, that is, toward the second inclined portion PB12 of the lower path PB1. The ribs 119 are arranged at intervals in the front-rear direction, and each of the ribs 119 extends in the left-right direction.

As shown in FIG. 3, the lower left corners of the ribs 119 are placed close to the right side of the pressing member 49. The lower end edge 119A of each rib 119 is inclined upward toward the right side from the lower left corner of the corresponding rib. The lower end edges 119A of the ribs 119 of the first chute member 110 form a third guide surface 113 which defines the second inclined portion PB12 of the lower path PB1. The third guide surface 113 extends so as to be contactable with the first surface SH1 of a sheet SH which is conveyed in the second inclined portion PB12, thereby guiding the sheet SH from above.

That is, the chute member 100 forms a guide surface 101 by the first guide surface 111 and the upper curved surface 116 of the first chute member 110, the lower curved surface 126 and the second guide surface 122 of the second chute member 120, the lower surface of the pressing member 49, and the third guide surface 113 of the first chute member 110. The guide surface 101 extends so as to be contactable with the first surface SH1 of a sheet SH which is conveyed by a plurality of conveying rollers (which will be described later), thereby guiding the sheet SH along the conveyance path P1.

Figure 4:
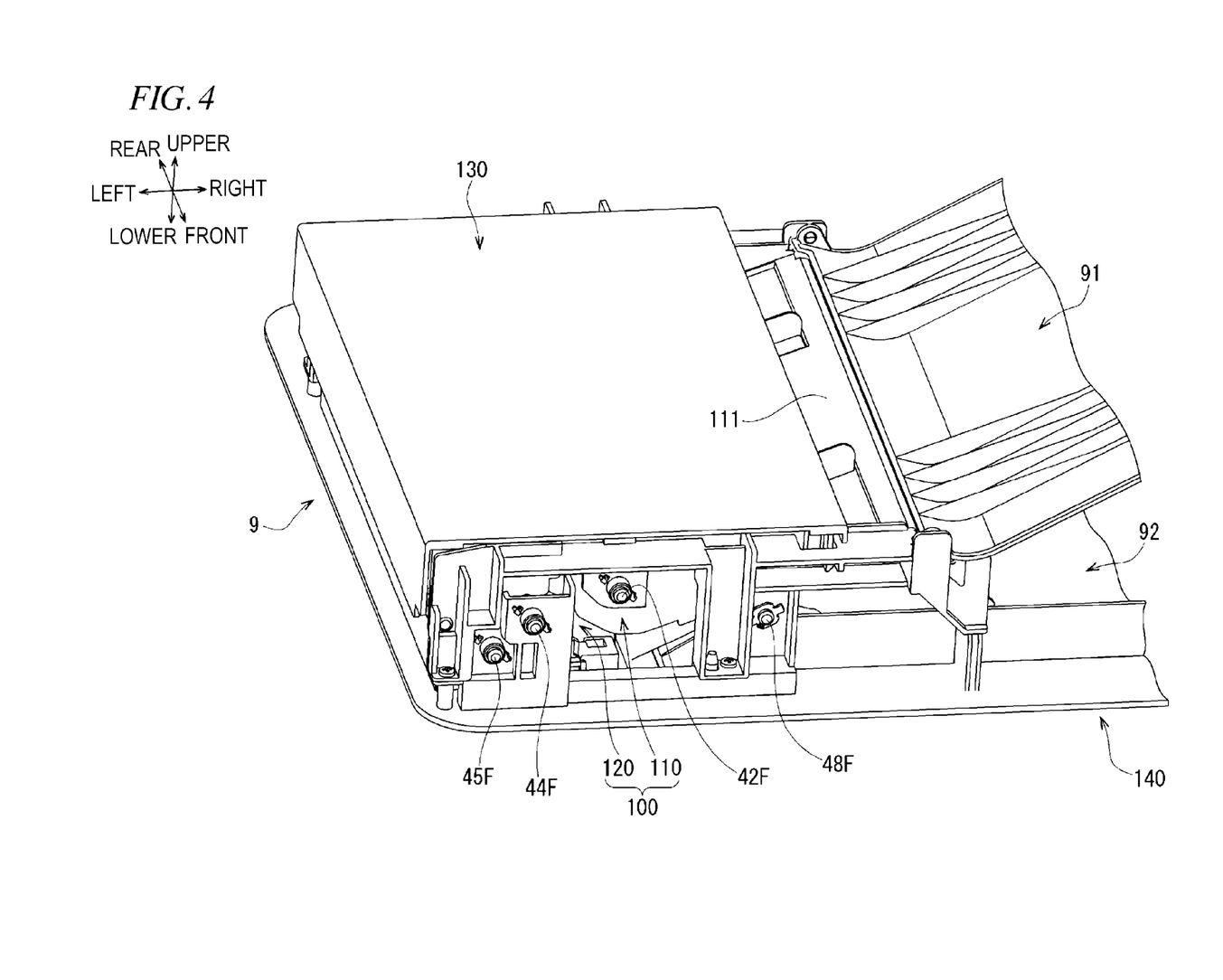

As shown in FIGS. 3 and 4, the first cover member 130 is assembled with the first chute member 110 from below. The first cover member 130 extends in the front-rear direction and the left-right direction so as to cover the first chute member 110.

As shown in FIG. 3, on the lower surface of the first cover member 130, a plurality of ribs 139 is formed. Although not shown, the ribs 139 are arranged at intervals in the front-rear direction, and extend in the left-right direction. The lower end edges 139A of the ribs 139 extend in the left-right direction along the first guide surface 111, with a gap from the first guide surface 111 of the first chute member 110. Further, the lower end edges 139A of the ribs 139 extend in the left direction and turn to the lower side, in an arc shape, with a gap from the upper curved surface 116 of the first chute member 110.

The lower end edges 139A of the ribs 139 of the first cover member 130 form a fourth guide surface 134 which defines the upper portions of the upper path PA1 and the curved path PC1. The fourth guide surface 134 extends so as to be contactable with the second surface SH2 of a sheet SH which is conveyed in the upper portions of the upper path PA1 and the curved path PC1, thereby guiding the sheet SH from above and from the left side.

As shown in FIGS. 3, 4 and 7 to 9, the second cover member 140 is assembled with the first chute member 110 and the second chute member 120 from below. The second cover member 140 extends in the front-rear direction and the left-right direction. The lower surface of the second cover member 140 forms the bottom of the opening-closing unit 9.

The upper surface of the right portion of the second cover member 140 forms the discharge tray 92. In a left portion of the second cover member 140, a rectangular opening 140H is formed so as to be elongated in the front-rear direction. As shown in FIG. 3, when the opening-closing unit 9 is closed, the opening 140H is positioned right above the read surface 82A such that the read surface 82A and the pressing member 49 face each other. In this case, the read surface 82A defines the reference portion PB10 of the lower path PB1. The read surface 82A extends so as to be contactable with the second surface SH2 of a sheet SH which is conveyed in the reference portion PB10, thereby guiding the sheet SH from below. In other words, the reference portion PB10 is set in a range including a position facing the predetermined read position where the read sensor 3B reads an image of a sheet SH which is conveyed by the conveyor 4, that is, the position of the read surface 82A.

As shown in FIGS. 3 and 7 to 9, in the left portion of the second cover member 140, a portion on the left side of the opening 140H forms a fifth guide surface 145A, and a portion on the right side of the opening 140H forms a fifth guide surface 145B.

As shown in FIG. 3, the fifth guide surface 145A extends downward and turns to the right, in an arc shape, with a gap from the lower curved surface 126 of the second chute member 120. Further, the fifth guide surface 145A extends to the opening 140H while being inclined downward toward the right side, with a gap from the second guide surface 122 of the second chute member 120.

The fifth guide surface 145A defines the lower portion of the curved path PC1 and the first inclined portion PB11 of the lower path PB1. The fifth guide surface 145A extends so as to be contactable with the second surface SH2 of a sheet SH which is conveyed in the lower portion of the curved path PC1 and the first inclined portion PB11 of the lower path PB1, thereby guiding the sheet SH from the left side and from below.

The fifth guide surface 145B extends to the discharge tray 92 while being inclined upward toward the right side, with a gap from the third guide surface 113 of the first chute member 110.

The fifth guide surface 145B defines the second inclined portion PB12 of the lower path PB1. The fifth guide surface 145B extends so as to be contactable with the second surface SH2 of a sheet SH which is conveyed in the second inclined portion PB12 of the lower path PB1, thereby guiding the sheet SH from below.

On the left end portion of the second cover member 140, a pressing member 149 is provided along the fifth guide surface 145A. The pressing member 149 is pressed toward the third platen glass 83 by a pressing spring 149S. A surface of the pressing member 149 facing the third platen glass 83 also defines the first inclined portion PB11 of the lower path PB1, together with the fifth guide surface 145A.

Figure 8:
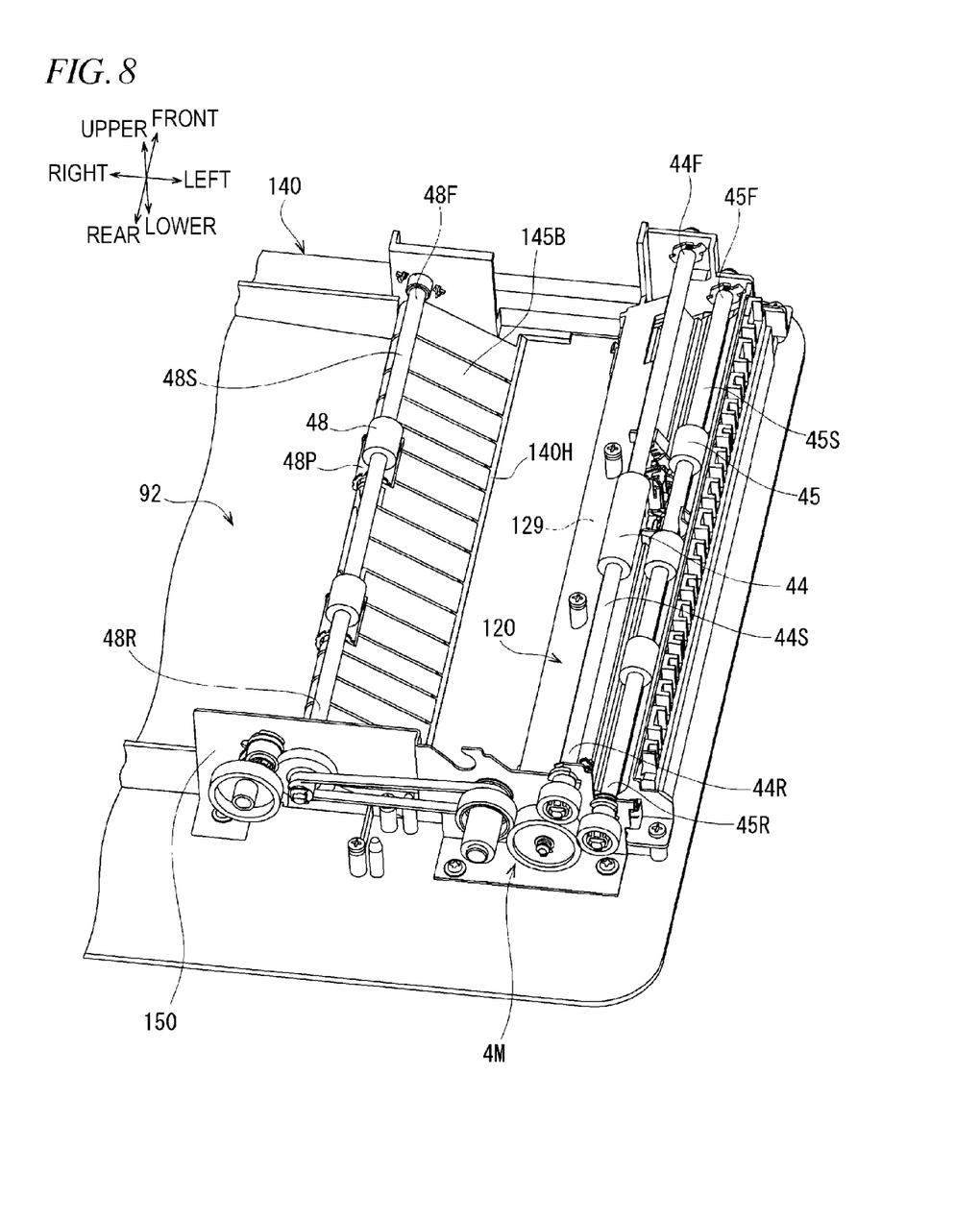
FIG. 8 is a perspective view illustrating a portion of the image reading apparatus of the illustrative embodiment including the second chute member, conveying rollers, a driving unit, and the like assembled with the second cover member.
Figure 9:
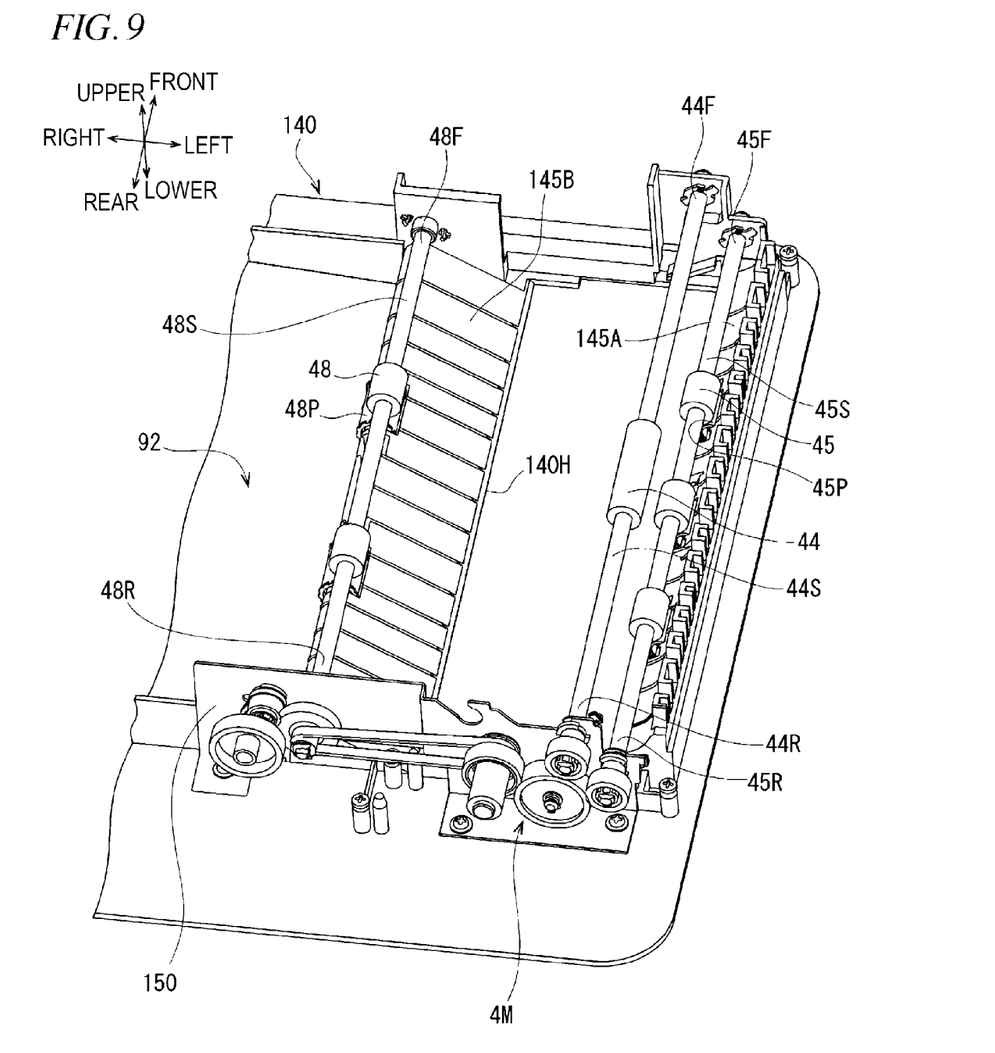
FIG. 9 is a perspective view illustrating the portion of the image reading apparatus of the illustrative embodiment shown in FIG. 8, without the second chute member.

As shown in FIGS. 8 and 9, the conveyor 4 includes a driving unit 4M and a frame member 150. The frame member 150 is attached to a portion of the second cover member 140 on the rear side with respect to the opening 140H and the fifth guide surfaces 145A and 145B, for example, by locking screws. The frame member 150 is formed by punching and bending a steel plate. The frame member 150 is curved such that a portion rises from the second cover member 140, and extends in the left-right direction. On the rising portion of the frame member 150, the driving unit 4M is held. The driving unit 4M is composed of a plurality of gear groups, pulleys, and the like, and is connected to an electric motor (not shown).

As shown in FIG. 3, the conveyor 4 includes the feeding roller 41, the separation roller 42, the separation piece 43, and a detecting unit 47, which are positioned on the upper path PA1, close to the feeding tray 91.

The feeding roller 41 and the separation roller 42 are provided so as to face the first guide surface 111 of the first chute member 110 from above. The separation roller 42 is assembled with the drive shaft 42S extending in the front-rear direction. The separation roller 42 rotates integrally with the drive shaft 42S.

As shown in FIG. 4, the front end portion 42F of the drive shaft 42S is supported on the first chute member 110 so as to be rotatable. Although not shown, similarly to the front end portion 42F, the rear end portion of the drive shaft 42S is supported on the first chute member 110 so as to be rotatable. On the rear end portion of the drive shaft 42S, a gear (not shown) is fixed so as to be engaged with a gear configuring the driving unit 4M shown in FIG. 8. A driving force of the electric motor (not shown) is transmitted to the drive shaft 42S through the driving unit 4M, whereby the separation roller 42 rotates.

As shown in FIG. 3, on the drive shaft 42S, a holder 42H is supported so as to be able to swing. The holder 42F protrudes from the drive shaft 42S toward the right side. The feeding roller 41 is supported on the right portion of the holder 42H so as to be rotatable. Although not shown in the drawings, on the holder 42H, a transmission gear group (not shown) is provided so as to transmit a rotation drive force from the drive shaft 42S to the feeding roller 41.

The separation piece 43 is provided on the first chute member 110 so as to face the separation roller 42 from below. The separation piece 43 is a plate-shaped member which is formed of a soft material such as rubber or elastomer. The separation piece 43 is attached to the upper surface of a separation piece holder 43F, which is supported on the first chute member 110 so as to be able to swing. Between the separation piece holder 43F and the first chute member 110, a pressing spring 43S is disposed. The pressing spring 43S presses the separation piece holder 43F upward, whereby the separation piece 43 is pressed against the separation roller 42.

The feeding roller 41 rotates around a shaft center parallel to the drive shaft 42S, thereby applying a conveyance force to sheets SH supported on the feeding tray 91, thereby sending the sheets SH toward the separation roller 42. The separation roller 42 rotates while being in contact with the sheets SH to be conveyed along the upper path PA1 from the feeding tray 91, thereby conveying the sheets SH toward the curved path PC1. The separation piece 43 separates the sheets SH to be conveyed by the separation roller 42 one at a time in cooperation with the separation roller 42.

As shown in FIGS. 3 and 5, the detecting unit 47 includes an actuator 47A and a photo interrupter 47B. The actuator 47A and the photo interrupter 47B are attached to the lower surface 112 of the first chute member 110. The actuator 47A is supported between two ribs 119 so as to be able to swing. The light path of the photo interrupter 47B is opened or blocked by swinging of the actuator 47A.

As shown in FIG. 3, the upper end portion of the actuator 47A protrudes upward from the first guide surface 111, and is positioned between the feeding roller 41 and the separation roller 42. If a sheet SH which is supported on the feeding tray 91 is inserted to the vicinity of the separation roller 42, the upper end portion of the actuator 47A is pressed by the sheet SH, thereby withdrawing downward from the first guide surface 111. In this way, the light path of the photo interrupter 47B is opened or blocked. Therefore, the detecting unit 47 detects a sheet SH which is sent from the feeding tray 91 to the upper path PA1, if the sheet SH is positioned in the vicinity of the separation roller 42.

As shown in FIGS. 3 and 7 to 9, the conveyor 4 includes a first conveying roller 44, a pinch roller 44P, a second conveying roller 45, a pinch roller 45P, a discharging roller 48, and a pinch roller 48P.

As shown in FIG. 3, on the upper path PA1, the first conveying roller 44 and the pinch roller 44P are disposed on the left side with respect to the separation roller 42 and the separation piece 43, that is, on the upstream side from them in the conveyance direction. The first conveying roller 44 is positioned on the first guide surface (111) side, and the pinch roller 44P is positioned on the fourth guide surface (134) side.

As shown in FIGS. 8 and 9, the first conveying roller 44 is assembled with a drive shaft 44S extending in the front-rear direction. The first conveying roller 44 rotates integrally with the drive shaft 44S.

The front end portion 44F of the drive shaft 44S is supported on the second cover member 140 so as to be rotatable. The rear end portion 44R of the drive shaft 44S is supported on the frame member 150 attached to the second cover member 140, so as to be rotatable. On the rear end portion 44R of the drive shaft 44S, a gear (not shown) is fixed so as to be engaged with a gear configuring the driving unit 4M. A driving force of the electric motor (not shown) is transmitted to the drive shaft 44S through the driving unit 4M, whereby the first conveying roller 44 rotates. The pinch roller 44P is driven to rotate by rotation of the first conveying roller 44.

As shown in FIG. 3, on the first inclined portion PB11 of the lower path PB1, the second conveying roller 45 and the pinch roller 45P are disposed on the left side from the read sensor 3A, that is, on the upstream side with respect to the read sensor 3A in the conveyance direction. The second conveying roller 45 is positioned on the second guide surface (122) side, and the pinch roller 45P is positioned on the fifth guide surface (145A) side.

As shown in FIGS. 8 and 9, the second conveying roller 45 is assembled with a drive shaft 45S extending in the front-rear direction. The second conveying roller 45 rotates integrally with the drive shaft 45S.

The front end portion 45F of the drive shaft 45S is supported on the second cover member 140 so as to be rotatable. The rear end portion 45R of the drive shaft 45S is supported on the frame member 150 attached to the second cover member 140, so as to be rotatable. On the rear end portion 45R of the drive shaft 45S, a gear (not shown) is fixed so as to be engaged with a gear configuring the driving unit 4M. A driving force of the electric motor (not shown) is transmitted to the drive shaft 45S through the driving unit 4M, whereby the second conveying roller 45 rotates. The pinch roller 45P is driven to rotate by rotation of the second conveying roller 45.

The first conveying roller 44 and the pinch roller 44P nip a sheet SH separated by the separation roller 42 and the separation piece 43, and convey the sheet SH to the curved path PC1. The second conveying roller 45 and the pinch roller 45P nip the sheet SH, and convey the sheet SH toward the read sensor 3A facing the first inclined portion PB11, and the read sensor 3B being still at the predetermined read position and facing the reference portion PB10. At this time, the sheet SH is pressed against the read surface 83A by the pressing member 149. Also, the sheet SH is pressed against the read surface 82A by the pressing member 49.

As shown in FIG. 3, the discharging roller 48 and the pinch roller 48P are disposed on the left end side of the second inclined portion PB12 of the lower path PB1 so as to face the discharge tray 92. The discharging roller 48 is positioned on the third guide surface (113) side, and the pinch roller 48P is positioned on the fifth guide surface (145A) side.

As shown in FIGS. 8 and 9, the discharging roller 48 is assembled with a drive shaft 48S extending in the front-rear direction. The discharging roller 48 rotates integrally with the drive shaft 48S.

The front end portion 48F of the drive shaft 48S is supported on the second cover member 140 so as to be rotatable. The rear end portion 48R of the drive shaft 48S is supported on the frame member 150 attached to the second cover member 140, so as to be rotatable. On the rear end portion 48R of the drive shaft 48S, a pulley is fixed. This pulley is connected to a pulley configuring the driving unit 4M by a timing belt. A driving force of the electric motor (not shown) is transmitted to the drive shaft 48S through the driving unit 4M, whereby the discharging roller 48 rotates. The pinch roller 48P is driven to rotate by rotation of the discharging roller 48.

If a sheet SH passes through the read surface 82A, the discharging roller 48 and the pinch roller 48P nip the sheet SH, and discharge the sheet SH onto the discharge tray 92.

<Image Reading Operation>

According to the image reading apparatus 1, in a case of reading an image of a document supported on the document supporting surface 81A, the scanning mechanism (not shown) of the reading unit 3 operates such that the read sensor 3B moves in the left-right direction between the lower side of the left end edge of the document supporting surface 81A and the lower side of the right end edge of the document supporting surface 81A, whereby the read sensor 3B reads the image of the document supported on the document supporting surface 81A. Thereafter, the scanning mechanism (not shown) operates such that the read sensor 3S moves from the right end side to the left end side in the reading unit 3, thereby returning to the original position.

Also, according to the image reading apparatus 1, in a case of reading images of the first surfaces SH1 and second surfaces SH2 of sheets SH supported on the feeding tray 91, the opening-closing unit 9 is kept at the closed position. Then, the scanning mechanism (not shown) of the reading unit 3 operates such that the read sensor 3B stops at the predetermined read position below the read surface 82A. At the predetermined read position, the read sensor 3B faces the reference portion PB10 of the lower path PB1.

If the sheets SH on the feeding tray 91 are sequentially conveyed along the conveyance path P1 by the conveyor 4, each sheet SH reaches the lower path PB1 through the upper path PA1 and the curved path PC1. In this case, when a sheet SH passes the first inclined portion PB11, the read sensor 3A reads an image of the first surface SH1 of the sheet SH. Next, when the sheet SH passes the reference portion PB10, the read sensor 3B being still at the predetermined read position reads an image of the second surface SH2 of the sheet SH. After the image reading, the sheet SH passes through the second inclined portion PB12, and is discharged onto the discharge tray 92 by the discharging roller 48 and the pinch roller 48P.

<Advantages>

In the image reading apparatus 1 of the illustrative embodiment, the guide surface 101 defines the conveyance path P1 including the upper path PA1, the lower path PB1, and the curved path PC1, and includes the third guide surface 113. The third guide surface 113 defines the second inclined portion PB12 and is formed by the first chute member 110. That is, in this image reading apparatus 1, the second chute member 120 having the holding portion 129 forms the second guide surface 122 but does not form the third guide surface 113. Therefore, it is possible to form the second chute member 120 small as shown in FIG. 6. In a comparative example in which the third guide surface 113 is formed by the second chute member 120, the size of the second chute member 120 increases by a portion shown by an alternate long and two short dashes line 120K in FIG. 6. In this comparative example, it is apparent that the component size of the second chute member 120 is large. However, according to the image reading apparatus 1, since the second chute member 120 is small, in the manufacturing process, it is difficult for handling to become complicated, and thus it is possible to efficiently perform work for mounting the read sensor 3A in the holding portion 129 of the second chute member 120 in a clean room.

As a result, according to the image reading apparatus 1, in the manufacturing process, it is possible to surely prevent fine particles and the like from being attached to the read sensor 3A to be mounted in the holding portion 129.

Therefore, according to the image reading apparatus 1 of the illustrative embodiment, it is possible to contribute to productivity growth while suppressing a reduction in reading quality.

Also, according to the image reading apparatus 1, as compared to a case where the second chute member 120 having the holding portion 129 forms the second guide surface 122 and the third guide surface 113, it is easy to eliminate undercuts from a forming die for the second chute member 120. Therefore, according to the image reading apparatus 1, it is possible to simplify a forming die for the second chute member 120, and it is possible to reduce the manufacturing cost.

Further, according to the image reading apparatus 1, since the third guide surface 113 is formed by the lower end edges 119A of the plurality of ribs 119 as shown in FIGS. 3 and 5, it is possible to reduce the contact area of a sheet SH with the third guide surface 113. Therefore, according to the image reading apparatus 1, the conveyance resistance of a sheet SH decreases, and thus it is possible to implement stable sheet conveyance.

Also, in the image reading apparatus 1, as shown in FIGS. 3 and 5, all of the separation roller 42, the separation piece 43, and the detecting unit 47 are attached to the first chute member 110. Therefore, according to the image reading apparatus 1, a variation in the relative position relation between the separation roller 42 and the separation piece 43 is suppressed, and thus it is possible to stabilize sheet separating performance. Further, according to the image reading apparatus 1, a variation in the relative position relation between the separation roller 42 and the detecting unit 47 is suppressed, and thus it is possible to stabilize the detection accuracy of the detecting unit 47.

Also, in the image reading apparatus 1, as shown in FIGS. 8 and 9, all of the first conveying roller 44, the second conveying roller 45, and the discharging roller 48 are attached to the second cover member 140. Further, in the image reading apparatus 1, the frame member 150 for holding the driving unit 4M is also attached to the second cover member 140. Therefore, according to the image reading apparatus 1, a variation in the relative position relation among the first conveying roller 44, the second conveying roller 45, the discharging roller 48, and the driving unit 4M is suppressed, and thus it is possible to stably convey sheets SH by the first conveying roller 44, the second conveying roller 45, and the discharging roller 48.

Also, according to the image reading apparatus 1, due to the above described effects, it is possible to accurately read images of the first surface SH1 and second surface SH2 of each sheet SH by the read sensors 3A and 3B.

Although the present invention has been described above on the basis of the illustrative embodiment, the present invention is not limited to the above described illustrative embodiment, and may be appropriately modified and applied without departing from the scope of the present invention.

Figure 10:
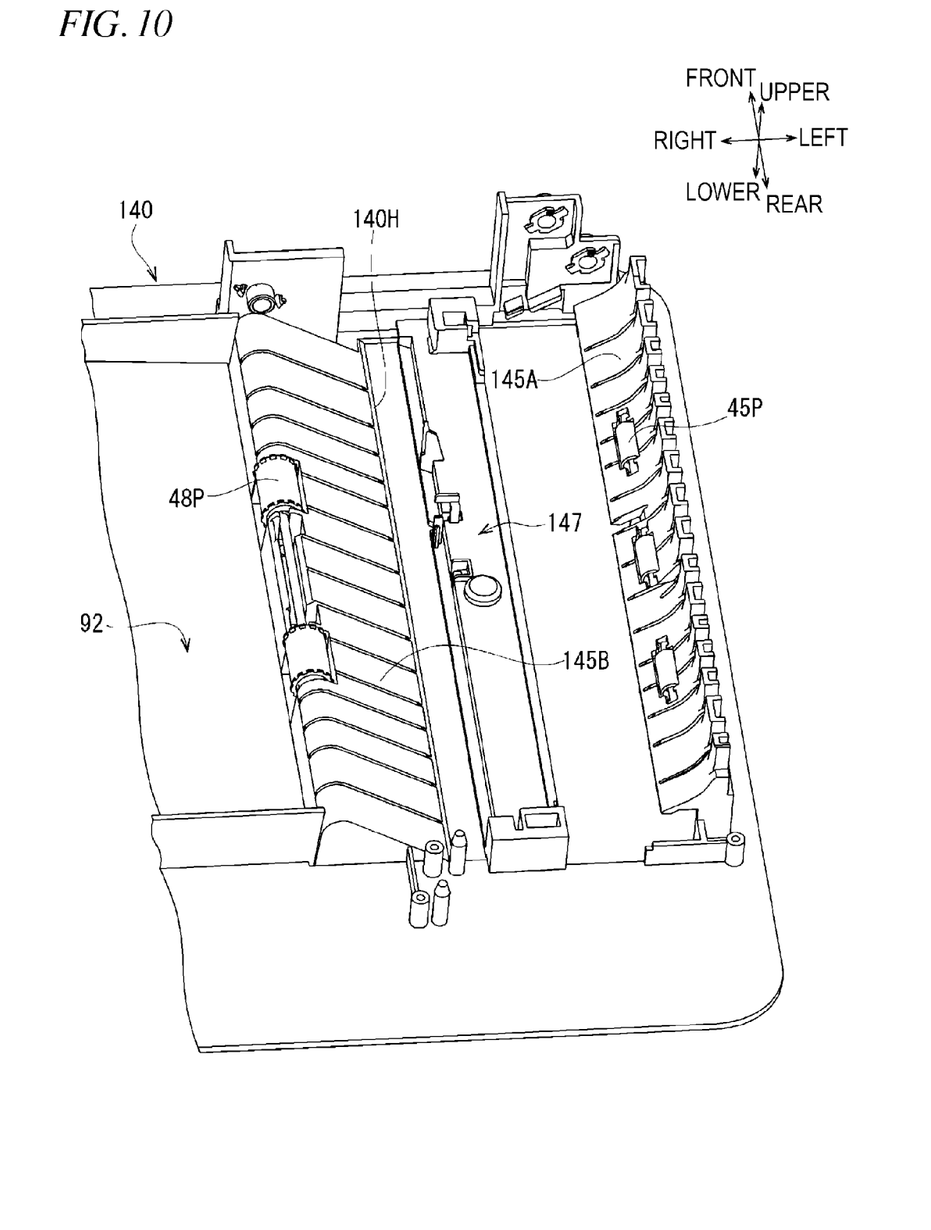
FIG. 10 is a perspective view illustrating a portion of an image reading apparatus of a modification including a second cover member.

For example, as shown in FIG. 10, on the second cover member 140, a pressing-member supporting portion 147 may be provided so as to extend in the front-rear direction over the opening 140H. In this case, it is possible to displace the pair of front and rear pressing-member holding portions 117A and the spring holding portion 117B shown in FIG. 5 from the first chute member 110 and install the pair of front and rear pressing-member holding portions 117A and the spring holding portion 117B to the lower surface side of the pressing-member supporting portion 147. As a result, it is possible to simplify the shape of the first chute member 110.

In the illustrative embodiment, the conveyor 4 is configured so as to convey sheets SH from the upper path PA1 to the lower path PB1 through the curved path PC1. However, the present invention is not limited thereto. The conveyor may be configured so as to convey sheets from the lower path to the upper path through the curved path.

Also, in the illustrative embodiment, the chute member 100 includes the first chute member 110 and the second chute member 120. In the guide surface 101, the first guide surface 111 is formed by the first chute member 110 and defines the upper path PA1, and the second guide surface 122 is formed by the second chute member 120 and defines the first inclined portion PB11, and the third guide surface 113 is formed by the first chute member 110 and defines the second inclined portion PB12. However, the present invention is not limited thereto. The chute member may include: a first chute member for forming a first guide surface, which defines an upper path, of the guide surface; and a second chute member for forming a second guide surface, which defines a second inclined portion, of the guide surface, and the first chute member may configure a third guide surface which defines a third inclined portion. For example, the first reading unit may be configured to read the image of the sheet when the sheet passes the second inclined portion, the second chute member may form the second guide surface defining the second inclined portion, and the first chute member may form the third guide surface defining the first inclined portion of the guide surface.

The present invention may be applied to apparatuses such as an image reading apparatus and a multi-function apparatus.

What is claimed is:

1. An image reading apparatus comprising:
a conveyor configured to define a conveyance path for conveying a sheet, the conveyance path comprising an upper path, a lower path that is positioned below the upper path and a curved path that connects the upper path and the lower path, wherein the conveyor is configured to convey the sheet from the upper path to the lower path through the curved path; and
a first reading sensor configured to read an image of the sheet being conveyed by the conveyor,
wherein the lower path comprises:
a reference portion, which is a predetermined portion positioned on the lower side from the curved path;
a first inclined portion inclined downward from the curved path toward the reference portion; and
a second inclined portion inclined upward from the reference portion toward a direction opposite to the curved path,
wherein the first reading sensor is configured to read an image of the sheet when the sheet passes the first inclined portion,
wherein the conveyor comprises a chute member which forms a guide surface
wherein the chute member comprises:
a first chute member that forms a first guide surface, the first guide surface configuring the guide surface and defining the upper path; and
a second chute member that forms a second guide surface, the second guide surface configuring the guide surface and defining the first inclined portion of the guide surface, and
wherein the first chute member forms a third guide surface that defines the second inclined portion of the guide surface.

2. The image reading apparatus according to claim 1,
wherein a plurality of ribs protruding toward the lower path is formed on a surface of the first chute member that is opposite to the first guide surface, and
wherein the third guide surface is configured by lower end edges of the plurality of ribs.

3. The image reading apparatus according to claim 1, further comprising:
a feeding tray configured to support the sheet from below the sheet, which is to be sent to the upper path; and
a discharge tray onto which the sheet is discharged after the sheet is conveyed in the lower path,
wherein the conveyor includes a separation roller and a separation piece,
wherein the separation roller is configured to rotate while being in contact with the sheet to be sent from the feeding tray to the upper path, thereby conveying the sheet toward the curved path,
wherein the separation piece faces the separation roller and is configured to separate the sheet to be conveyed by the separation roller one at a time in cooperation with the separation roller, and
wherein the separation roller and the separation piece are attached to the first chute member.

4. The image reading apparatus according to claim 3,
wherein the conveyor comprises a detecting unit configured to detect a sheet which is sent from the feeding tray to the upper path, if the sheet is positioned in the vicinity of the separation roller, and
wherein at least a portion of the detecting unit is attached to the first chute member.

5. The image reading apparatus according to claim 1,
wherein the conveyor comprises a first cover member and a second cover member,
wherein the first cover member forms a fourth guide surface, the fourth guide surface facing the first guide surface from above and guiding the sheet in the upper path, and
wherein the second cover member forms a fifth guide surface, the fifth guide surface facing the second guide surface and the third guide surface from below and guiding the sheet in the lower path.

6. The image reading apparatus according to claim 5,
wherein the conveyor comprises a plurality of conveying rollers configured to convey the sheet along the conveyance path, and
wherein each of the plurality of conveying rollers is attached to the second cover member.

7. The image reading apparatus according to claim 6,
wherein the conveyor comprises:
a frame member attached to the second cover member.

8. The image reading apparatus according to claim 5,
wherein the fourth guide surface extends so as to be contactable with a second surface, which is opposite to the first surface, of the sheet for guiding the sheet in the upper path, and
wherein the fifth guide surface extends so as to be contactable with the second surface of the sheet for guiding the sheet in the lower path.

9. The image reading apparatus according to claim 1, wherein the first chute member and the second chute member form the guide surface such that the guide surface extends so as to be contactable with a first surface of the sheet, the first surface facing the lower side in the upper path and facing the upper side in the lower path, for guiding the sheet in the conveyance path.

10. The image reading apparatus according to claim 1, wherein the second chute member has a holding portion, the holding portion being recessed from the second guide surface toward the upper path side and holding the first reading sensor.

11. An image reading apparatus comprising:
a conveyor configured to define a conveyance path for conveying a sheet, the conveyance path comprising an upper path, a lower path that is positioned below the upper path and a curved path that connects the upper path and the lower path;
a main body unit that has a document supporting surface for supporting a document, which is a read target, on a top surface thereof;
a first reading sensor configured to read an image of the sheet being conveyed by the conveyor,
a second reading sensor, which is accommodated in the main body unit, and which is configured to read an image of a document supported on the document supporting surface while moving; and
a cover pivotally supported on the main body unit so as to be displaceable between a closed position to cover the document supporting surface and an open position to expose the document supporting surface,
wherein the conveyor and the first reading sensor are provided to the cover,
wherein the lower path comprises:
a reference portion, which is a predetermined portion positioned on the lower side from the curved path;
a first inclined portion inclined downward from the curved path toward the reference portion; and
a second inclined portion inclined upward from the reference portion toward a direction opposite to the curved path,
wherein the first reading sensor is configured to read an image of the sheet when the sheet passes one of the first inclined portion and the second inclined portion,
wherein the conveyor comprises a chute member which forms a guide surface
wherein the chute member comprises:
a first chute member that forms a first guide surface, the first guide surface configuring the guide surface and defining the upper path; and
a second chute member that forms a second guide surface, the second guide surface configuring the guide surface and defining the one of the first inclined portion and the second inclined portion,
wherein the first chute member forms a third guide surface that defines the other of the first inclined portion and the second inclined portion of the guide surface, and
wherein in a state where the cover is at the closed position, the second reading sensor is configured to be positioned at a position facing the reference portion of the lower path and to read an image of a second surface, which is opposite to the first surface, of the sheet conveyed by the conveyor and passing the reference portion.

12. The image reading apparatus according to claim 11, wherein the conveyor is configured to convey the sheet from the upper path to the lower path through the curved path,
wherein the first reading sensor is configured to read an image of the sheet when the sheet passes the first inclined portion,
wherein the second chute member forms the second guide surface, which defines the first inclined portion of the guide surface, and
wherein the first chute member forms the third guide surface, that defines the second inclined portion of the guide surface.

13. The image reading apparatus according to claim 12, further comprising:
a feeding tray configured to support the sheet from below the sheet, which is to be sent to the upper path; and
a discharge tray onto which the sheet is discharged after the sheet is conveyed in the lower path,
wherein the conveyor includes a separation roller and a separation piece,
wherein the separation roller is configured to rotate while being in contact with the sheet to be sent from the feeding tray to the upper path, thereby conveying the sheet toward the curved path,
wherein the separation piece faces the separation roller and is configured to separate the sheet to be conveyed by the separation roller one at a time in cooperation with the separation roller, and
wherein the separation roller and the separation piece are attached to the first chute member.

14. The image reading apparatus according to claim 11, wherein the reference portion is set in a range including a position facing a predetermined read position where the second reading sensor reads an image of a sheet which is conveyed by the conveyor.

15. The image reading apparatus according to claim 11, wherein the conveyor is configured to convey the sheet from one of the upper path and the lower path to the other of the upper path and the lower path through the curved path.

16. The image reading apparatus according to claim 11, wherein a plurality of ribs protruding toward the lower path is formed on a surface of the first chute member that is opposite to the first guide surface, and
wherein the third guide surface is configured by lower end edges of the plurality of ribs.

17. The image reading apparatus according to claim 11, wherein the conveyor comprises a first cover member and a second cover member,
wherein the first cover member forms a fourth guide surface, the fourth guide surface facing the first guide surface from above and guiding the sheet in the upper path, and
wherein the second cover member forms a fifth guide surface, the fifth guide surface facing the second guide surface and the third guide surface from below and guiding the sheet in the lower path.

18. The image reading apparatus according to claim 17, wherein the conveyor comprises a plurality of conveying rollers configured to convey the sheet along the conveyance path, and
wherein each of the plurality of conveying rollers is attached to the second cover member.

19. The image reading apparatus according to claim 11, wherein the first chute member forms the first guide surface such that the first guide surface extends so as to be contactable with a first surface of the sheet, the first surface facing the lower side in the upper path and facing the upper side in the lower path, for guiding the sheet in the conveyance path.

20. The image reading apparatus according to claim 11, wherein the second chute member has a holding portion, the holding portion being recessed from the second guide surface toward the upper path side and holding the first reading sensor.

* * * * *